March 19, 1957 J. J. SLOMER 2,785,789
HYDRAULIC TAKE-UP FOR A CONVEYOR
Filed Dec. 26, 1952 2 Sheets-Sheet 1
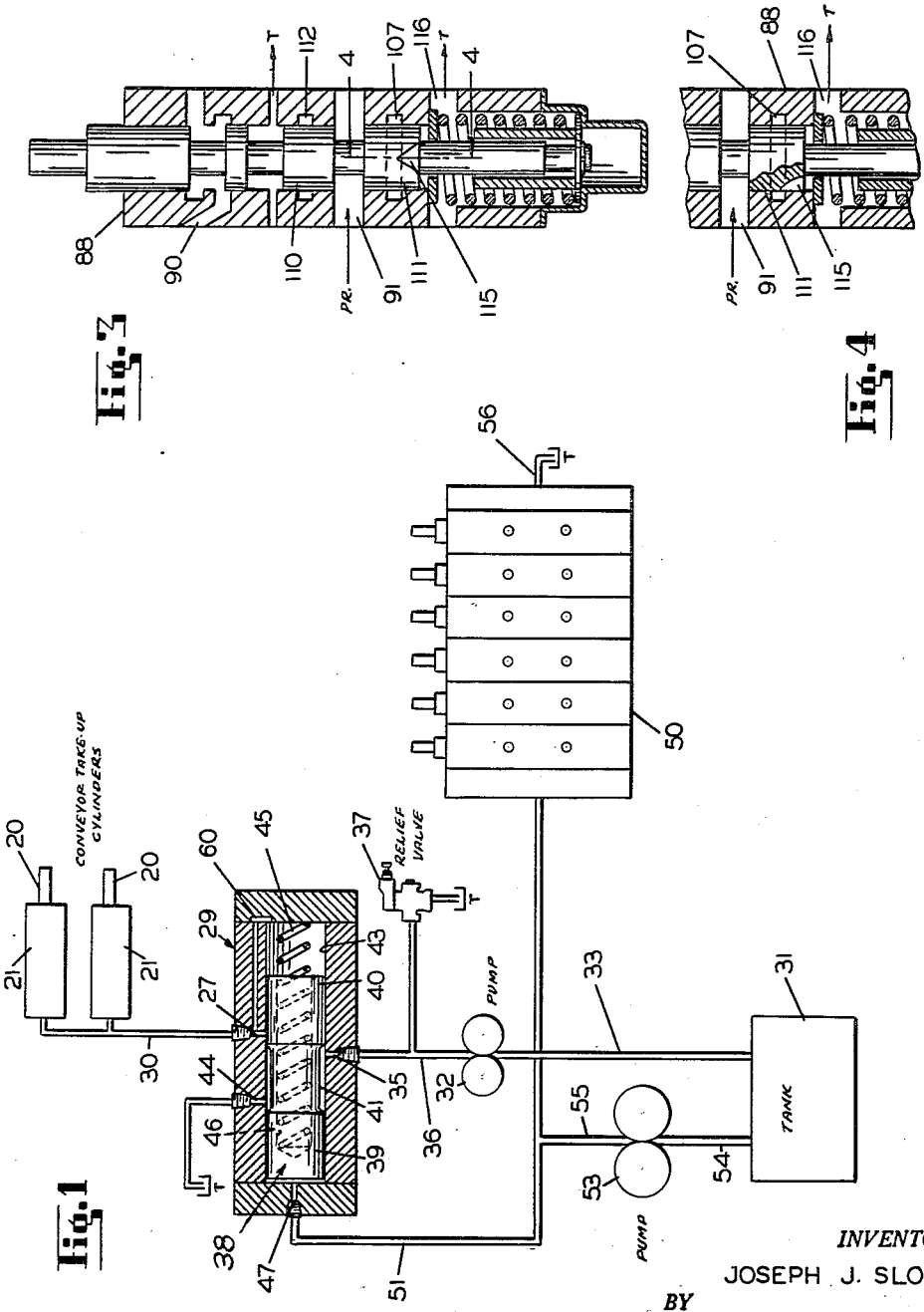
INVENTOR.
JOSEPH J. SLOMER
BY
Murray A. Gleeson
ATTORNEY

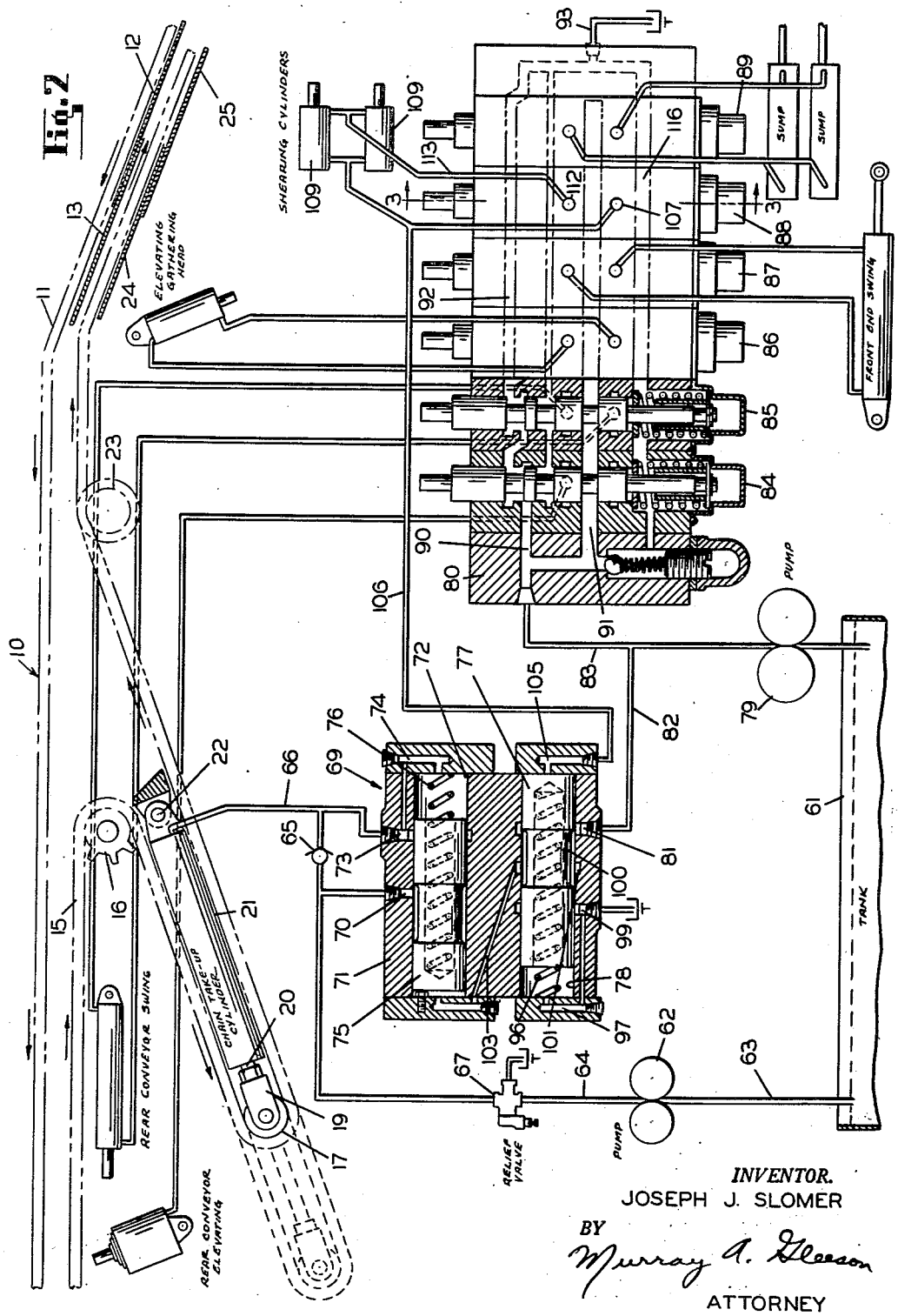

United States Patent Office 2,785,789
Patented Mar. 19, 1957

2,785,789

HYDRAULIC TAKE-UP FOR A CONVEYOR

Joseph J. Slomer, Chicago, Ill., assignor to Goodman Manufacturing Company, Chicago, Ill., a corporation of Illinois Application December 26, 1952, Serial No. 328,093

10 Claims. (Cl. 198—208)

This invention relates to improvements in mining machines and more particularly relates to a new and improved hydraulic tensioning device for maintaining tension on the conveyor chain of a conveyor particularly adapted for a combined mining and loading machine.

This invention is an improvement in the tensioning device shown and described in application Serial No. 236,548 filed on July 17, 1951 by Frank A. Lindgren and now Patent No. 2,642,981 and entitled "Mining and Loading Machine."

In mining machines, and particularly combined mining and loading machines having an extensible and vertically movable cutting and dislodging head mounted on a mobile frame, and provided with a laterally flexible conveyor movable along the machine frame from a position beneath the cutting and dislodging head to the extreme rear end of the machine, the power requirements for driving the conveyor and the cutting and dislodging head are frequently excessive, particularly during the hydraulic feeding operation of the cutting and dislodging head. This is due primarily to the tendency for the pressure in the chain take-up cylinders to increase to an excessive value upon the feeding operation of the machine resulting in excessive tightening of the conveyor chain.

My invention has as one of its objects to remedy these difficulties by providing a valve in the hydraulic circuit for the take-up, reducing the pressure in the take-up cylinder as the pressure required for operating the other hydraulically operated parts of the machine may increase so as to accommodate a limited amount of movement of the take-up cylinder in a slackening direction and provide slack in the lower run of the conveyor chain during operation of the machine.

Another object of my invention is to provide a fluid operating system for a mining machine of the class described having an endless conveyor and hydraulic take-up therefor utilizing two separate pumps, one being of a larger volumetric capacity than the other, the one of the larger capacity being connected to the valve means for effecting operation of the hydraulically actuated parts of the machine and also controlling the supply of fluid under pressure from the pump of small volumetric capacity to the hydraulic take-up cylinder, and supplying pressure thereto upon the operation of certain hydraulic parts of the machine.

A further object of my invention is to provide a hydraulic take-up for the conveyor of a combined mining and loading machine having a control valve operated upon predetermined increases in pressure, effected by the operation of certain operative parts of the machine, for supplying pressure to the take-up for the conveyor upon the operation of certain operative parts of the machine and for relieving pressure from the take-up and accommodating limited movement thereof in the slackening direction when certain operative parts of the machine are inoperative.

A further object of my invention is to provide a hydraulic system particularly adapted to control the operation of certain operative parts of a combined mining and loading machine having a conveyor extending therealong, including a hydraulic take-up for the conveyor and a valve relieving pressure from the take-up and accommodating limited movement thereof in a slackening direction upon predetermined increases in load on the machine.

A further and more detailed object of my invention is to provide a combined mining and loading machine having a flexible conveyor for conveying the mined coal to the discharge end of the machine and having a hydraulic system effecting certain operations of the machine and a hydraulic take-up for maintaining tension on the conveyor, together with a control connection to the take-up operated by a pump of one volumetric capacity and controlled by a pump of a higher volumetric capacity, affording a source of pressure for the operative functions of the machine and relieving pressure from the take-up and accommodating limited movement thereof in a slackening direction upon the performance of the cutting and loading operations of the machine.

Still another and more detailed object of my invention is to provide a novel and improved form of hydraulic take-up, particularly adapted to take-up slack on the conveyor of a combined mining and loading machine having a valve operated upon the operation of certain operative parts of the system by pressure, for operating said parts and controlling the supply of fluid under pressure to the hydraulic take-up, and having a limited fluid storage capacity therein accommodating movement of the take-up in a slackening direction upon the blocking of fluid under pressure to the take-up, effected by a rise of pressure in the system.

A further object of my invention is to provide a novel and simplified form of valve for controlling a take-up of an extensible conveyor, so constructed and arranged as to be operated by pressure to relieve pressure from the take-up upon the effecting of certain operations of the machine and having a storage capacity accommodating limited movement of the take-up in a slackening direction upon the operation of certain parts of the machine, and relieving the conveyor drive motor of excessive loads.

These and other objects of my invention will appear from time to time as the following specification proceeds and with reference to the accompanying drawings wherein:

Figure 1 is a diagrammatic view illustrating one form in which my invention may be embodied;

Figure 2 is a diagrammatic view illustrating another form in which my invention may be embodied;

Figure 3 is a sectional view taken through the valve controlling the shearing operations of the machine and along line 3—3 of Figure 2; and Figure 4 is a fragmentary sectional view taken through the valve shown in Figure 3 along line 4—4 thereof.

In the embodiment of my invention illustrated in the drawings, I have shown my improved form of take-up as being applied to a tension take-up like that shown and described in an application Serial No. 236,548 filed by Frank Lindgren on August 13, 1951 and incorporated in a combined mining and loading machine for mining and loading coal from the solid without shooting.

In Figure 2 of the drawings, I have diagrammatically illustrated a conveyor 10, which may be of the laterally flexible center strand chain and flight type having a horizontally swingable discharge end and having an extensible forward end accommodating a mining head and gathering element (not shown) to be advanced with respect to the machine frame into a solid coal face, and mine and gather the mined coal, and deposit it onto the receiving end of the conveyor. The combined mining and loading machine may be of a type similar to that shown and described in an application Serial No. 186,326 filed by Frank A. Lindgren and Richard C. Lundquist on September 23, 1950 and now Patent No. 2,695,700 and entitled "Mining Apparatus" so not herein shown or described in detail.

The conveyor 10 is diagrammatically shown as having an upper run 11 movable from the forward end of the machine, along bottom plates 12 and 13, the plate 12 of which may be extensible with respect to the plate 13, to accommodate the receiving end of the conveyor to advance with the gathering head (not shown) during the mining operation. The conveyor may change its direction of travel about a sprocket (not shown) at the rear end of a laterally swingable trough section and may be driven by a drive sprocket 16 in a manner similar to that shown and described in the aforementioned application Serial No. 236,548 of Frank A. Lindgren so not herein shown or described further.

A lower run 15 of the chain is shown as being trained around the drive sprocket 16, and rearwardly and downwardly therefrom around a take-up idler 17. The take-up idler 17 may be mounted on a transverse block 19 carried on the ends of piston rods 20, 20 extensible from take-up cylinders 21, 21. The cylinders 21, 21 are shown as being pivoted at their rear ends to the machine frame on a transverse shaft 22 as in my aforementioned application Serial No. 236,548 and now Patent No. 2,642,981. From the take-up idler 17, the chain is shown as extending in an upwardly inclined direction over an idler 23 and forwardly and downwardly therefrom along support plates 24 and 25 to a direction changing idler (not shown) at the forward end of the machine.

In Figure 1 of the drawings I have shown a simplified form of control for the take-up which may be incorporated in the conveyor take-up system shown in Figure 2. In this form of my invention, I have shown the take-up cylinders 21, 21 having piston rods 20, 20 extensible therefrom and connected at their head ends with a port 27 of a pressure operated distributor valve 29, through a pressure line 30.

The source supply of fluid under pressure to the take-up cylinders 21, 21 is shown as comprising a tank 31 and a pump 32 connected with said tank through an intake line 33. The pump 32 is shown as being connected with a port 35 leading through a wall of the body of the distributor valve 29, intermediate its ends, by means of a pipe 36. A relief valve 37 is shown as being connected to the pipe 36 between the pump 32 and distributor valve 29 to return fluid back to tank upon overload conditions and, when the valve 29 is in position to supply fluid under pressure to the take-up cylinders 21, 21 and the conveyor may be extended or may be laterally swung to one side of the machine or the other.

The valve 29 is shown as being a piston type of valve including a valve piston 38 having two spaced lands 39 and 40 at the ends thereof, and an intermediate reduced diameter portion 41. The reduced diameter portion 41 of the piston 38 is shown as forming a passageway defining member in a valve chamber 43 for the piston, accommodating the flow of fluid back to tank through a port 44 when the lands 39 and 40 are in the extreme left hand position shown in Figure 1, and also defining a passageway from the port 35 to the port 27 when the land 39 is moved to the right an amount sufficient to block the port 44, and the land 40 opens the port 27.

The lands 39 and 40 are shown as being biased to the left by valve spring 45 seated against the right hand end of the valve chamber 43 and extending within a recess or drilled hole 46, extending along the valve piston 38. A port 47 leads into the valve chamber 43 through the end thereof opposite the spring 45, to supply fluid under pressure to move the valve piston 38 to the right against the bias of the spring 45 and position the lands 39 and 40 to block the return port 44 and open the port 27, to supply fluid under pressure to the take-up cylinders 21, 21.

The port 47 is shown as being connected with a valve bank 50 controlling operation of the various operative parts of the machine, by means of a pipe 51. A pump 53 of a larger volumetric capacity than the pump 32, is shown as having an intake 54 connected with the tank 31, and as having a pressure line 55 connected with the pipe 51, to supply fluid under pressure to the port 47, to move the valve piston 38 against the bias of the spring 45 upon the operation of any of the valves in the valve bank 50 and the building up of sufficient pressure in the pressure line 51 to overcome the bias of the spring 45. The valve bank 50 is shown as being connected to tank by a return line 56.

When the valves in the valve bank 50 are in the neutral position shown in Figure 1, fluid under pressure may pass directly through said valve bank and be returned to the tank 31. In this situation pressure will be relieved from the left hand end of the valve piston 38 and the spring 45 will bias said valve piston in position to block the passage of fluid under pressure to the chain tightening cylinders 21, 21.

In Figure 1 of the drawings I have shown a passageway 60 leading along the valve body from the port 27 and opening into the right hand end of the valve chamber 43. Thus when the valve piston 38 is in position to block the passage of fluid under pressure to the take-up cylinders 21, 21, and to hold pressure therein, fluid may pass from the pressure line 30 through the passageway 60 to the right hand end of the chamber 43. This will accommodate sufficient fluid to permit a limited amount of slackening movement of the chain tightening piston rods 20, 20, and thus provide slack on the lower run of the chain and relieve pressure from the take-up cylinders 21, 21.

When however pressure is built up in the pressure line 51, moving the valve piston 38 to the right against the bias of the spring 45, the valve piston 35 will first return fluid to the passageway 60 to the head ends of the cylinders 21, 21. The valve piston 38 then opening the port 27 and closing the port 44, fluid under pressure may be supplied directly from the pump 32 through the port 27 and pressure line 30, to the cylinders 21, 21, to maintain tension on the chain. When the valve piston 38 is in the right hand position just described, extension of the conveyor or lateral swinging movement thereof is accommodated by the relief valve 37, set to relieve pressure from the pressure line 30 to accommodate the conveyor chain to retract the piston rods 20, 20 within the cylinders 21, 21, and thus accommodate extensible movement of the conveyor or the various other adjustments thereof without placing any undue stresses on the conveyor chain or the drive motor therefor.

In the form of my invention illustrated in Figure 2 of the drawings I have shown a tank 61 and a pump 62 connected with said tank through an intake line 63. I have also shown a pressure line 64 leading from the pressure side of said pump. A check valve 65 is provided in the pressure line adjacent its juncture with a pressure line 66, leading to the head ends of chain tightening or take-up cylinders 21, 21. The pressure line 64 is also shown as having a relief valve 67 therein, returning fluid under pressure to tank, upon retraction of the piston rods 20, 20 in the cylinders 21, 21, or upon overload conditions, and as being connected with a distributor valve 69.

The pressure line 64 is shown as being connected on the downstream side of the check valve 65 with a port 70, leading through a body 71 of the distributor valve 69 to a chamber 72 thereof. The pressure line 66 is in turn shown as being connected with the valve chamber 72 by means of a port 73, leading through the valve body 71, and shown as being spaced to the right of the port 70. The port 73 is also shown as being connected with the right hand end of the valve chamber 72 by means of a passageway 74 leading from the port 73, through the valve body to and through the head end thereof and opening to the right hand end of the chamber 72.

The distributor valve 69 has a valve piston 75 like the piston 38 of the valve 29, and operated against the bias of a spring 76, under the control of a valve piston 77, shown as being mounted in the same valve block as the valve piston 75. The valve piston 77 is movable along a valve chamber 78 in the valve body 71, connected with the left hand end of the valve chamber 72 by a passageway 103.

A pump 79 is shown as being provided to supply fluid under pressure to the valve chamber 78, for moving the valve piston 75 against the bias of the spring 76, and also as supplying fluid under pressure to a valve bank 80 controlling the operation of the various operative parts of the machine. The pump 79 is of a larger volumetric capacity than the pump 62 and is shown as being connected with a port 81 leading through the valve body 71 to the valve chamber 78, intermediate the ends thereof, by means of a pressure line 82. A second pressure line 83 leading from the pressure line 82 is shown as being connected to the valve bank 80 to supply fluid under pressure to valves 84, 85, 86, 87, 88 and 89 thereof, and shown as being spring biased piston valves.

The valve bank 80 may be like the valve bank 50 and as herein shown, the pressure line 83 communicates with pressure passageways 90 and 91, for supplying fluid under pressure to the individual valves of the valve bank, to effect the various operations of the machine. When the valves 84 to 89 in the valve bank 80 are in the neutral position shown in Figure 2, fluid under pressure may pass through the pressure line 90 and a passageway 92 leading past the pistons to the various valves in the valve bank and may be returned to tank through a return line 93. When the valves 84 to 89 are in this neutral position, as in the embodiment of my invention illustrated in Figure 1 of the drawings, there will be insufficient pressure in the pressure line 82 to move the valve piston 75 of the valve 69 against the bias of the spring 76. The valve piston 75 will then be biased in position to block the port 73 and to hold fluid under pressure on the take-up cylinders 21, 21, subject to the relief attained through the by-pass line 74 to the right hand end of the valve chamber 72.

The valve piston 77 is biased toward the right hand end of the valve chamber 78 by a valve spring 96 extending within said valve piston and shown as seated on the left hand end of the valve chamber 78. A passageway 97 is shown as leading from the left hand end of the valve chamber 78, to a port 99, leading from the valve chamber 78 through the wall of the valve body intermediate the ends thereof, and connected to tank, to return fluid leaking by the valve piston 77 to the end of the valve body to tank, and also to return fluid from the valve chambers 72 and 78 to tank when the valve piston 77 may be biased along the valve chamber 78 to the left, by fluid under pressure exerted against the right hand end thereof, as will hereinafter be more fully described as the specification proceeds.

The port 81 is shown as communicating with a reduced diameter portion 100 of the valve piston 77, intermediate the ends thereof. The reduced diameter portion 100 defines a fluid passageway to a port 101 connected with a passageway 103, communicating with the left hand end of the valve chamber 72, to supply fluid under pressure to move the valve piston 75 to the right against the bias of the spring 76, and position the valve piston 75 to supply fluid under pressure from the port 70 to the port 73 and pressure line 66, to take-up on the conveyor chain, as in the form of my invention illustrated in Figure 1.

A passageway 105 is shown as leading to the right hand end of the valve chamber 78, to supply fluid under pressure to the right hand end of the valve piston 77 and move said piston against the bias of the spring 96 in position to block the port 81 and open the port 99, and return fluid from the left hand end of the valve chamber 72 to tank. The passageway 105 is shown as being connected with a pressure line 106 connected with a port 107 of the valve 88, and also connected with the head ends of cylinders 109, 109, which are connected with the mining head to feed the mining head along the coal face, and mine the same.

When the valve 88 is in position to supply fluid under pressure to the shearing cylinders 109, 109, pressure will also be exerted on the right hand end of the valve piston 77 through the pressure line 106 and passageway 105, to move said valve piston to the left. When this occurs the port 81 will be blocked by the valve piston 77 and fluid will be released from the left hand end of the valve chamber 72 through the port 99. The valve spring 76 will then move the valve piston 75 to the left to the position shown in Figure 2, to block the port 73 and hold fluid under pressure in the chain tightening or take-up cylinders 21, 21, and also to accommodate fluid to flow from the cylinders 21, 21 into the right hand end of the valve chamber 72, and relieve pressure from the take-up cylinders 21, 21 and permit slackening of the lower or return run of the conveyor chain 11, during the mining or shearing operation.

Thus during the mining or shearing operation when the loads on the motors for driving the mining head and also driving the conveyor 10 are excessive, the pressure in the cylinders 21, 21 is reduced, putting a limited amount of slack in the lower or return run of the conveyor chain and reducing the load on the drive motors for the machine and the power consumption thereof.

The valve 88 is shown in Figure 3 as having two spaced valve pistons or lands 110 and 111, on opposite sides of the pressure line 91, leading through the valve block when the valve is in the neutral position. When the valve is in this position, the pressure port 107 is shown as being blocked by the valve piston 111. A pressure port 112 is also shown as being blocked by the valve piston 110. The port 112 is shown as being connected with a pressure line 113 connected with the piston rod ends of the cylinders 109, 109, and effective to supply fluid under pressure to raise the mining head and hold it in the various desired positions of elevation.

The valve piston 111 is shown as having a bleeder notch or passageway 115 formed therein and communicating with the port 107 and a return passageway 116, extending along the valve body and valve bank and connected with the return line 93.

The purpose of the bleeder passageway 115 is to return fluid from the cylinders 109, 109 and pressure line 106 to tank when the valve 88 is in a neutral position, and thus to relieve pressure from the right hand end of the valve piston 77 and accommodate movement thereof to the right by the valve spring 96. The valve piston 77 will thus always move to the neutral position shown in Figure 2, to supply fluid under pressure to the left hand end of the valve piston 75 whenever the valve 88 is in a neutral position.

It should here be understood that with the form of my invention illustrated in Figure 2, the operation of the conveyor chain take-up is like that in the form of my invention shown in Figure 1. That is when either one or all of the valves 84, 85, 86, 87 or 89 may be operated, the pump 79, supplying fluid under pressure to effect the various desired operations of the machine will also supply fluid under pressure to the valve chamber 78 through the pressure line 82 and will supply pressure to the valve chamber 72 through the passageway 103, to move the valve 75 against the bias of the spring 76, into position to admit fluid under pressure from the pressure line 64 to the pressure line 66, to supply fluid under pressure to the take-up cylinders 21, 21. As pressure conditions are relieved and the bias of the spring 76 overcomes pressure entering the left hand end of the valve chamber 72 through the passageway 104, the port 73 will be closed and fluid under pressure from the pressure line 66 may pass to the right hand end of the valve chamber 72, and accommodate a limited slackening movement of the pistons 20, 20, relieving tension from the return run of the conveyor chain 11.

When however the power requirements may become excessive as during the operation of the mining head and the application of fluid under pressure to the cylinders 109, 109, to effect vertical feeding movement of the mining head, pressure applied through the line 106 to the right hand end of the valve piston 77 through the passageway 105, will move said valve piston to the left along the valve chamber 78 in position to close the port 81 and relieve fluid from the left hand end of the valve chamber 72 through the passageway 103, valve chamber 78 and the return port 99. The valve spring 76 will then bias the valve piston 75 along the valve chamber 72 to the left hand position shown in Figure 2, blocking the passage of fluid under pressure to the pressure line 66 and take-up cylinders 21, 21. Pressure will also be relieved from the cylinders 21, 21 to the right hand end of the valve chamber 72. This will accommodate slackening movement of the piston rods 20, 20 and take-up idler 17, and relieve tension from the lower or return run of the conveyor chain, and reduce the power requirements to drive the conveyor, at the time the power requirements for dislodging the coal from the solid may be excessive.

It will be understood that modifications and variations may be effected without departing from the scope of the novel concepts of the present invention.

I claim as my invention:

1. In an apparatus of the class described, an endless conveyor, take-up hydraulic cylinder and piston means for maintaining tension on said conveyor, other hydraulic cylinder and piston means for carrying out certain operations of the apparatus, a pump for supplying fluid under pressure to said take-up cylinder and piston means, a second pump for suppling fluid under pressure to said other hydraulic cylinder and piston means, a distributor valve controlling the supply of fluid under pressure to said take-up cylinder and piston means and including a valve chamber having a valve piston therein biased into position to hold fluid under pressure in said take-up cylinder and piston means, a pressure line leading from said first-mentioned pump to said valve chamber for supplying fluid under pressure thereto, a second pressure line leading from said second pump to an end of said valve chamber for supplying fluid under pressure thereto to move said valve piston into position to supply fluid under pressure to said take-up cylinder and piston means upon the building up of pressure in said first mentioned pump attained by the operation of said other hydraulic cylinder and piston means, and said valve chamber having a space therein at the opposite end of said connection from said second pressure line thereto when said valve piston is in its biased position and having fluid communication with said take-up cylinder and piston means to accommodate a limited slackening of said conveying element and a reduction in the driving load thereof when said valve piston is in its biased position to block the passage of fluid under pressure to said take-up cylinder and piston means, and to thereby accommodate relief of pressure in said take-up cylinder and piston means and a limited slackening of said conveying element and a reduction in the driving load thereon.

2. In an apparatus of the class described having an endless conveying element, take-up hydraulic cylinder and piston means for maintaining tension on said conveying element, a pump, a distributor valve having a valve chamber with a valve piston movable therealong, a fluid connection supplying fluid from said pump to said valve chamber, a second fluid connection from said valve chamber to said take-up cylinder and piston means, spring means moving said valve piston along said valve chamber into position to hold fluid under pressure in said take-up cylinder and piston means, and a by-pass passageway from said second mentioned fluid connection to said valve chamber, and with said valve chamber forming a space for the storage of fluid from said take-up cylinder and piston means, when said valve piston is in position to block the passage of fluid from said pump to said second fluid connection, and to thereby accommodate relief of pressure in said take-up cylinder and piston means and a limited slackening of said conveying element and reduction in the driving load thereon.

3. In a mining apparatus having an endless conveying element and hydraulic cylinder and piston means for effecting certain operations of the apparatus, take-up hydraulic cylinder and piston means for maintaining tension on said conveying element, a pump, a distributor valve comprising a valve chamber having a valve piston therein, a fluid pressure line connecting said pump to said valve chamber intermediate the ends thereof, a second fluid pressure line connecting said valve chamber to said take-up cylinder and piston means, a spring biasing said valve piston into position to hold pressure in said second fluid pressure line and said take-up cylinder and piston means, said valve chamber affording a limited storage space for fluid from said take-up cylinder and piston means at one end thereof, when said valve piston is in its spring biased position, a by-pass line leading from said second pressure line to said end of said valve chamber, affording a storage space for fluid, to by-pass fluid thereto and accommodate a limited slackening movement of said conveying element, control valve means controlling certain of the other operations of the machine, a second pump for supplying fluid under pressure to said control valve means, a fluid connection from said second pump to said distributor valve chamber for moving said distributor valve piston against its spring bias and positioning said valve piston in position to admit fluid under pressure from said first pump to said hydraulic take-up cylinder and piston means, upon the operation of said control valve means.

4. In a mining apparatus having an endless conveying element and hydraulic cylinder and piston means for effecting certain operations of the apparatus, take-up hydraulic cylinder and piston means for said conveying element, a pump, a distributor valve having a valve chamber with a valve piston therein, a fluid pressure line connecting said pump to supply fluid to said valve chamber, a second fluid pressure line connecting said valve chamber to said take-up cylinder and piston means, a spring biasing said valve piston into position to hold pressure in said take-up cylinder and piston means, one end of said valve chamber affording a limited storage space for fluid from said take-up cylinder and piston means, when said valve piston is in its spring biased position, a by-pass line leading from said second pressure line to said end of said valve chamber, control valve means for said first cylinder and piston means, a second pump for supplying fluid under pressure to said control valve means, a fluid connection from said second pump to said distributor valve chamber for moving said distributor valve piston against its spring bias to admit fluid under pressure from said first pump to said take-up cylinder and piston means, upon the operation of said cylinder and piston means, the fluid connection from said second pump to said distributor valve including a second valve chamber having a valve piston movable therein, a pressure line supplying fluid from said second pump to said second valve chamber, a spring biasing said second mentioned valve piston to admit fluid under pressure from said pressure line to said valve chamber, a fluid connection from said second valve chamber to said distributor valve chamber, to move said distributor valve piston against its spring bias, and a pressure line leading from a control valve in said control valve means to the spring biased end of said second mentioned valve chamber, to move said second mentioned valve piston into position to release pressure from both of said valve chambers and accommodate said distributor valve to move to its spring biased position, whereby pressure may be relieved from said take-up cylinder and piston means to accommodate limited slackening of the conveyor chain, upon the effecting of certain operative movements of the machine.

5. In a mining apparatus having an endless conveying element and hydraulic cylinder and piston means for effecting certain operations of the apparatus, take-up cylinder and piston means for maintaining tension on said conveying element, a pump, a distributor valve having a valve chamber and a valve piston movable therealong, a pressure line from said pump to said valve chamber intermediate the ends thereof, a second pressure line leading from said second valve chamber to said take-up cylinder and piston means, for supplying fluid under pressure thereto, a by-pass line connecting said pressure lines together, a check valve in said by-pass line, preventing the passage of fluid under pressure from said first pressure line to said second pressure line and relieving pressure from said second pressure line upon retractable movement of said take-up cylinder and piston means, a relief valve in said first mentioned pressure line relieving fluid under pressure in said line, to accommodate retractable movement of said take-up cylinder and piston means, said valve chamber forming at one end thereof a limited storage space for fluid from said take-up cylinder and piston means, and a by-pass line from said second mentioned pressure line to said end of said valve chamber and said storage space, so as to accommodate limited slackening movement of said conveying element when said valve piston is in position to hold fluid under pressure in said take-up cylinders, and to relieve the driving load on said endless conveying element.

6. In a mining apparatus having an endless conveying element and hydraulic cylinder and piston means for effecting certain operations of the apparatus, take-up cylinder and piston means for maintaining tension on said conveying element, a pump, a distributor valve having a valve chamber and a valve piston movable therealong, a pressure line from said pump to said valve chamber intermediate the ends thereof, a second pressure line leading from said second valve chamber to said take-up cylinder and piston means, for supplying fluid under pressure thereto, a by-pass line connecting said pressure lines together, a check valve in said by-pass line, preventing the passage of fluid under pressure from said first pressure line to said second pressure line and relieving pressure from said second pressure line upon retractable movement of said take-up cylinder and piston means, a relief valve in said first mentioned pressure line relieving fluid under pressure in said line, to accommodate retractable movement of said take-up cylinder and piston means, said valve chamber forming at one end thereof a limited storage space for fluid from said take-up cylinder and piston means and a by-pass line from said second mentioned pressure line to said end of said valve chamber and said storage space, so as to accommodate limited slackening movement of said conveying element when said valve piston is in position to hold fluid under pressure in said take-up cylinder and to relieve the driving load on said endless conveying element, a second pump, control valve means for said last mentioned hydraulic cylinder and piston means for effecting certain operations of the machine, a fluid pressure connection from said second pump to said control valve means, and a fluid pressure connection from said second pump to said distributor valve, for moving the same against the bias of its spring upon operation of said control valve means.

7. In an apparatus of the class described, a conveyor including an endless conveyor chain, a hydraulic take-up cylinder and piston for maintaining tension on said conveyor chain, other hydraulic cylinder and piston means for carrying out certain operations of the apparatus, valve means controlling the operation of said other cylinder and piston means, a pump connected with said valve means for supplying fluid under pressure thereto, a second pump of a lower volumetric capacity than said first pump, a distributor valve having a valve chamber and a valve piston movable therein, a fluid connection from said second pump to supply fluid to said valve chamber, a fluid connection from said valve chamber to said take-up cylinder and piston means, a spring biasing said valve piston into position to block the flow of fluid to said take-up cylinder and piston means, a pressure line leading from said first pump and valve to the opposite end of said valve piston from said spring, for moving said valve piston against the bias of said spring into position to admit fluid from said second pump to said take-up cylinder and piston means, upon operation of said second cylinder and piston means, and a by-pass passageway leading from said take-up cylinder and piston means to the end of said valve chamber opposite from its spring biased end and accommodating the relief of fluid pressure from said take-up cylinder and piston means and a limited slackening of the return run of said conveyor chain when said distributor valve is in its spring biased position.

8. A take-up for an extensible conveyor wherein the extending and retracting operations of the conveyor are effected hydraulically, comprising an endless conveying element, a take-up cylinder and piston means for taking up slack in said conveying element, a pump connected with said take-up cylinder and piston for supplying fluid under pressure thereto, the connection from said pump to said cylinder and piston including a pressure line, a distributor valve including a valve chamber having a valve piston therein, a connection from said pressure line to said distributor valve, another connection from said distributor valve to said take-up cylinder and piston means, a spring biasing said valve piston in position to hold fluid under pressure in said take-up cylinder and piston means, a relief valve in said pressure line on the upstream side of said distributor valve, relieving fluid under pressure from said take-up cylinder and piston means upon extension of the conveyor, a second source of fluid under pressure for effecting extension and retraction of said conveying element and connected to the spring biased end of said distribution valve chamber to move said valve piston against said spring in position to supply fluid under pressure from said pressure line to said take-up cylinder and piston means, upon extension or retractable movement of said conveying element.

9. In an extensible conveyor particularly adapted for a continuous mining machine for mining and loading coal from the solid, wherein the feeding operations of the machine for the mining of coal are also effected hydraulically, a take-up cylinder and piston means for taking up slack in the conveyor, a pump, a distributor valve having a valve chamber with a valve piston therein spring biased to one end of said valve chamber, a port leading into said valve chamber, a pressure line connected from said pump to said port, a second port leading from said valve chamber, a pressure line leading from said second port to said take-up cylinder and piston means, said second port being blocked by said valve piston when in its spring biased position, a by-pass line leading from said second port to said valve chamber, to relieve fluid under pressure from said take-up cylinder and piston means when said valve is in its spring biased position, a second source of fluid under pressure for effecting the feeding operation of the machine and including a second pump, a valve controlling operation of said distributor valve, a pressure line leading from said second pump to said valve, to supply fluid under pressure thereto, said pressure line being connected to supply fluid under pressure to the means for controlling the feeding operation of the machine, and a second pressure line leading from the means controlling the feeding operation of the machine and connected to operate said second valve and move the same into position to block the supply of fluid to said distributor valve and to relieve fluid pressure therefrom, upon the operation of said feeding means, and thereby accommodate slackening of the return run of the conveyor.

10. In a take-up for an extensible conveyor particularly adapted for a continuous mining machine for mining and loading coal from the solid, wherein certain feeding operations of the machine are effected hydraulically, an endless conveying element, a take-up cylinder and piston means for taking up slack in said conveying element and accommodating extensible movement thereof, a pump, a distributor valve including a valve chamber having a valve piston movable therein and spring biased to one end of said valve chamber, a port leading into said valve chamber, a pressure line connecting said pump to said port, a second port spaced from said first port and leading from said valve chamber, a pressure line connecting said second port to said take-up cylinder and piston means, said second port being blocked by said valve piston when in its spring biased position, to by-pass fluid to said valve chamber and relieve pressure from said take-up cylinder and piston means when said second port is blocked by said valve piston, a relief valve in said first mentioned pressure line, accommodating extension of said conveyor, a second source of fluid under pressure for effecting certain operations of the machine comprising a second pump and control valve means connected therewith, a fluid pressure connection from said second pump to said control valve means, a fluid pressure connection from said second pump to said distributor valve chamber, to move the valve piston therein against its spring bias to supply fluid under pressure from said first mentioned pressure line to said take-up cylinder and piston means upon building up of pressure in said fluid pressure connection by the operation of certain of said control valve means, the fluid pressure connection from said second pump to said distributor valve chamber including a valve having a valve chamber and a valve piston movable therein and spring biased to one end of said valve chamber, a port connected with said second pump and leading into said valve chamber, a fluid connection from said last mentioned valve chamber to an end of said distributor valve chamber, said last mentioned valve piston being biased in position to admit fluid under pressure through said fluid connection, to move said distributor valve piston against its spring bias, a pressure line connected from one of said valves in said control valve means to an end of said second valve chamber to move said valve against its spring bias and block the passage of fluid under pressure to said distributor valve chamber and relieve fluid under pressure from both of said valve chambers upon the operation of said one valve in said control valve means.

References Cited in the file of this patent

UNITED STATES PATENTS

| | | |
|---|---|---|
| 1,943,061 | Douglas | Jan. 9, 1934 |
| 2,336,955 | Ott | Dec. 14, 1943 |
| 2,588,283 | Osgood | Mar. 4, 1952 |